G. HALINKA & F. ANTON.
SAW SETTING TOOL.
APPLICATION FILED FEB. 17, 1914.
1,102,500.
Patented July 7, 1914.
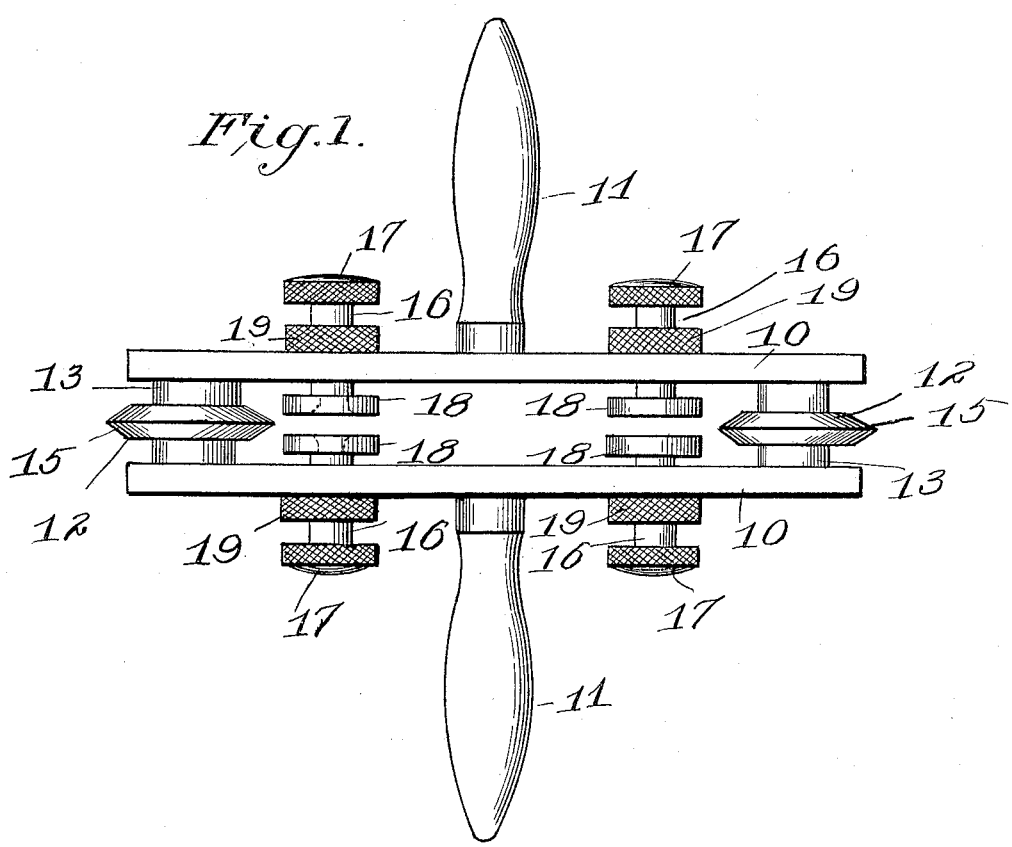
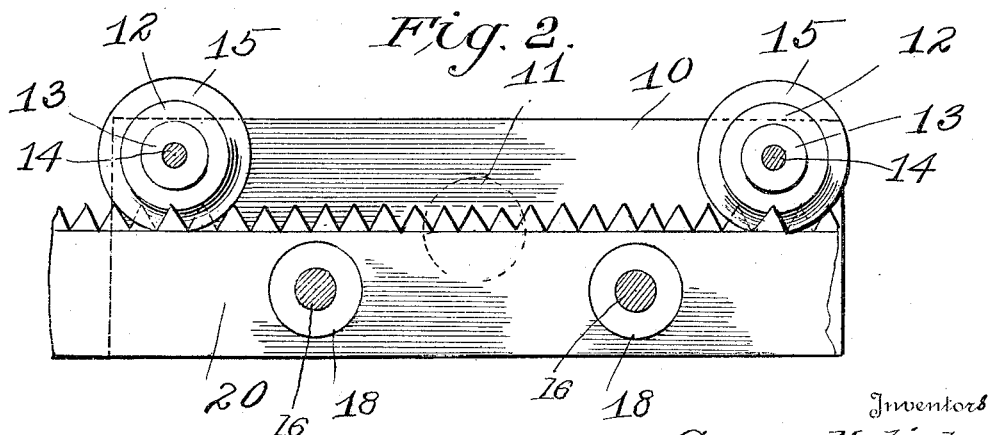
Witnesses
Inventors
George Halinka
Frank Anton
By A. M. Wilson
Attorney

UNITED STATES PATENT OFFICE.

GEORGE HALINKA AND FRENK ANTON, OF DETROIT, MICHIGAN.

SAW-SETTING TOOL.

1,102,500.  Specification of Letters Patent.  Patented July 7, 1914.

Application filed February 17, 1914. Serial No. 819,205.

*To all whom it may concern:*

Be it known that we, GEORGE HALINKA and FRENK ANTON, subjects of the King of Hungary, residing at Detroit, in the county of Wayne and State of Michigan, have invented certain new and useful Improvements in Saw-Setting Tools, of which the following is a specification.

This invention relates to certain new and useful improvements in saw setting tools.

An object of the invention is to provide a portable tool for setting the teeth of a saw after the teeth have been swaged.

A further object is to provide a guide for the saw, the saw guide constituting the frame which carries the saw teeth setting rollers.

With the above and other objects in view, that will appear as the nature of the invention is better understood, the same consists in the novel construction, combination and arrangement of parts to be hereinafter more fully described and then claimed, reference being had to the accompanying drawings by like characters denoting corresponding parts throughout the several views, and wherein:—

Figure 1 is a top plan view of the setting implement, and Fig. 2 is a longitudinal sectional view of the same.

Referring more specifically to the drawing accompanying this application and in which is shown a preferred embodiment of our invention, the reference numeral 10 designates a pair of spaced side plates constituting the frame of the setting implement and carried by the said plates 10 are the handles 11, constituting grips by which the implement may be manipulated.

The plates 10 are preferably rectangular in plan and are held a prescribed distance apart by the saw setting rollers 12. These setting rollers 12 are provided with lateral extensions or collars 13 which receive the stub shafts 14 carried by the side plates 10, and further are beveled in opposite directions to form a periphery 15 V-shaped in cross-section.

Means are provided to guide the device in its movement over a saw and comprise threaded bolts 16 passing through the side plates 10 at points preferably spaced in the plates inwardly of the setting rollers 12. These bolts 16 are provided upon their outer ends with operating heads 17 and upon their inner ends or the ends that engage the side faces of the saw to be set with guide plates or disks 18. Lock nuts 19 are carried by the threaded bolts 16 and are disposed on the said bolts between the operating heads 17 and the outer faces of the side plates 10 and are adapted to engage the said plates when the bolts 16 are in adjusted position.

In order to set the teeth of the saw or to even the outward bend of the teeth, the saw 20 is mounted in a suitable clamp or vise and the device as above described mounted on the saw as shown in Fig. 2, that is, the side plates 10 are lowered upon the saw so that the V-shaped peripheries 15 of the setting rollers 12 are positioned between the teeth that are alternately offset in opposite directions. When in such position the threaded bolts 16 are adjusted to cause the guide disks 18 carried thereby to lightly engage the side faces of the saw 20 whereupon the lock nuts 19 are caused to engage the outer faces of the side plates 10 to hold the guide disks in such position. The handles 11 are then gripped by the operator and the device moved back and forth over the saw, during which movement the setting rollers 12 will even the offset of the teeth of the saw 20. The threaded bolts 16 may be easily and quickly adjusted to adapt the same to saws of a different thickness while the pressure upon the device will control or determine the particular offset of the teeth.

While we have shown and described the preferred embodiment of our invention, we do not wish to confine ourselves thereto, as various forms and modifications may be had without departing from the spirit and scope of the invention as claimed.

Having thus fully described our invention, what we claim as new and desire to secure by Letters Patent of the United States is:—

In a saw setting tool, a pair of side plates, setting rollers disposed between the plates at the ends thereof and adjacent the upper edge, operating handles carried by said plates and arranged substantially centrally thereof, saw guiding members carried by said plates and extending inwardly thereof at a point below the medial line of the plates, and means for holding the saw guiding members in fixed position.

In testimony whereof we affix our signatures in presence of two witnesses.

GEORGE HALINKA.
FRENK ANTON.

Witnesses:
ALIX SATH,
JOHN VERES.

Copies of this patent may be obtained for five cents each, by addressing the "Commissioner of Patents, Washington, D. C."